(12) United States Patent
Ichihashi

(10) Patent No.: US 8,670,026 B2
(45) Date of Patent: Mar. 11, 2014

(54) VIDEO DISPLAY APPARATUS CAPABLE OF VIEWING VIDEOS BY A PLURALITY OF PERSONS USING A PLURALITY OF SHUTTER EYEGLASSES AND METHOD FOR CONTROLLING SAME

(75) Inventor: Nobuharu Ichihashi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/908,560

(22) Filed: Oct. 20, 2010

(65) Prior Publication Data

US 2011/0102561 A1 May 5, 2011

(30) Foreign Application Priority Data

Nov. 2, 2009 (JP) ................................. 2009-251758
Jul. 12, 2010 (JP) ................................. 2010-157793

(51) Int. Cl.
*H04N 13/04* (2006.01)
(52) U.S. Cl.
USPC .......................................................... 348/56
(58) Field of Classification Search
USPC .................................................. 348/56, 564
IPC ...................................................... H04N 13/04
See application file for complete search history.

(56) References Cited

U.S. PATENT DOCUMENTS 6,188,442 B1 * 2/2001 Narayanaswami ........... 348/564

FOREIGN PATENT DOCUMENTS

JP 08-043766 2/1996
JP 10-240212 9/1998

* cited by examiner

*Primary Examiner* — Jay Patel
*Assistant Examiner* — Neil Mikeska
(74) *Attorney, Agent, or Firm* — Cowan, Liebowitz & Latman, P.C.

(57) ABSTRACT

The video display apparatus is provided that the breaking up of the video image should not be viewed by users when the frame rate of video content items is changed in association with the change in the number of viewed content items. The video display apparatus, which is capable of viewing a plurality of video content items using the shutter eyeglasses, controls the plurality of video content items by time-division, and performs the shutter control of the shutter eyeglasses in association with the display videos. When the number of video content items which are to be viewed is changed, the control section controls the shutters of all of the shutter eyeglasses so that they close for the frame period of the video content items that are first output after a change of the frame rate.

8 Claims, 7 Drawing Sheets

VIDEO DISPLAY APPARATUS CAPABLE OF VIEWING VIDEOS BY A PLURALITY OF PERSONS USING A PLURALITY OF SHUTTER EYEGLASSES AND METHOD FOR CONTROLLING SAME

BACKGROUND OF THE INVENTION

1. Field of the Invention

The present invention relates to a video display apparatus that is capable of viewing videos by a plurality of persons using a plurality of shutter eyeglasses, and a method for controlling the same.

2. Description of the Related Art

Conventionally, a 3D (Three Dimensional) video viewing system using a shutter eyeglass has generally been employed. Japanese Patent Laid-Open No. 08-043766 discloses a stereoscopic video system, a composite video depiction system, and the like that can cause viewers to recognize only a specific screen from three-dimensional videos or a plurality of screens.

Also, Japanese Patent Laid-Open No. 10-240212 discloses a system in which a plurality of different video content items can be synchronously viewed by a plurality of persons using a plurality of shutter eyeglasses. In this system, N video signals are periodically displayed on the same screen by time-division. When a user selects any one of the N video signals displayed on the screen, the plurality of shutter eyeglasses open and close in response to the period of the selected video signal.

In the conventional technique, responding to changes in the number of viewable video content items at the same time by a plurality of persons is difficult. In the technique disclosed in Japanese Patent Laid-Open No. 10-240212, the frame rate (refresh rate) for the display device is not changed even when the number of video content items to be viewed is changed. More specifically, even when four persons view the same video content, the inputs from the four input terminals are still in effect, and their subsequent processing sections also always need to be operated continuously, whereby the load of the entire system is not reduced. In order to optimize the load of the entire system, it is contemplated that the frame rate (refresh rate) of the display device can be switched when the number of video content items to be viewed has been changed. However, when the discontinuous frame of the synchronization signal occurs during switching, the video image is likely to break up. More specifically, since the timing of the synchronization signal also changes in association with the frame rate (refresh rate), the operation of the display device side immediately after a change in frame rate becomes unstable, resulting in the breaking up of the video image or drop-out of video images.

Accordingly, the present invention provides a video display apparatus in which the viewers can ensure that there is no viewing of video images that have broken up when the frame rates of the video content items are changed in association with the change in the number of video content items which are to be viewed.

SUMMARY OF THE INVENTION

In view of the foregoing, according to an aspect of the present invention, a video display apparatus, which outputs a plurality of video content items to a display section by time-division such that the plurality of different video content items are viewable to a plurality of persons by using a plurality of shutter eyeglasses and performs the shutter control of the plurality of shutter eyeglasses in association with the video content items which are to be viewed, is provided that includes a processing unit configured to apply time-division processing to the plurality of video content items for outputting the resulting video content items on the display section; and a control unit configured to control a frame rate of the video content items, which are output on the display section by the processing unit, depending on the number of video content items which are to be viewed and to perform the shutter control of the plurality of shutter eyeglasses. When the number of video content items which are to be viewed is changed, the control unit changes the frame rate of the video content items, which are output by the processing unit on the display section, and controls the shutters of the plurality of shutter eyeglasses to be closed for the frame period of the video content items that are firstly output after a change of the frame rate.

According to the present invention, the viewers can ensure that the breaking up of video images is not viewed when the frame rates of the video content items are changed in association with the change in the number of video content items which are to be viewed.

Further features of the present invention will become apparent from the following description of exemplary embodiments with reference to the attached drawings.

DESCRIPTION OF THE EMBODIMENTS

Figure 1:
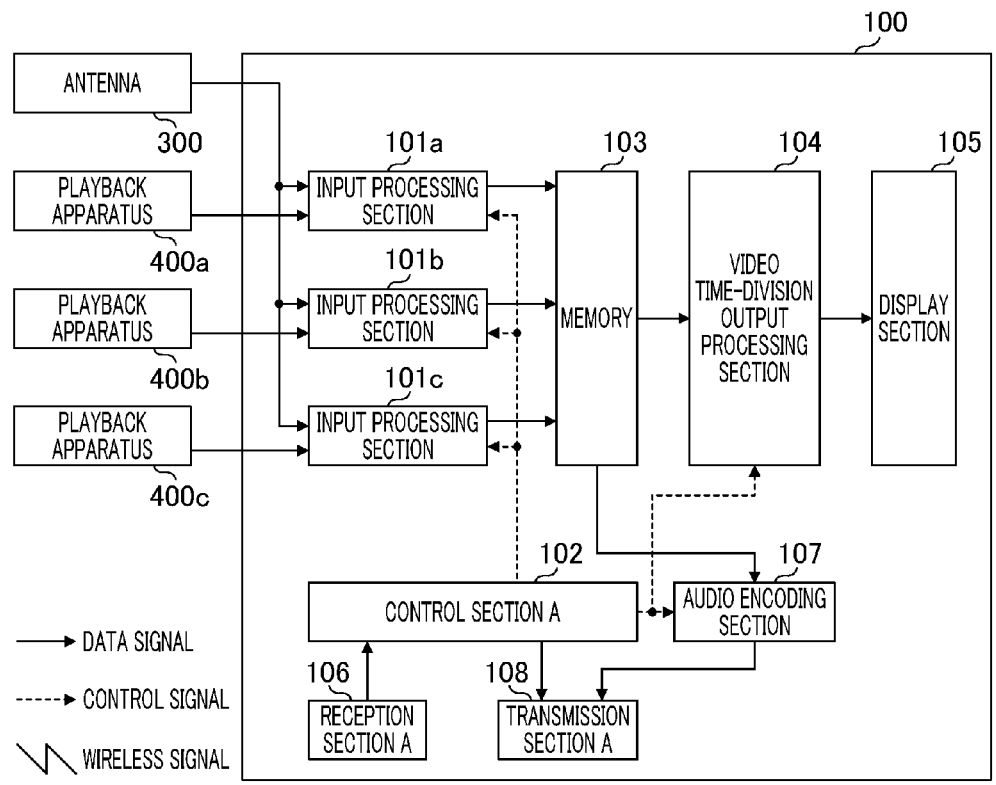
FIG. 1 is a functional block diagram illustrating an example of the system configuration according to an embodiment of the present invention.
Figure 1:
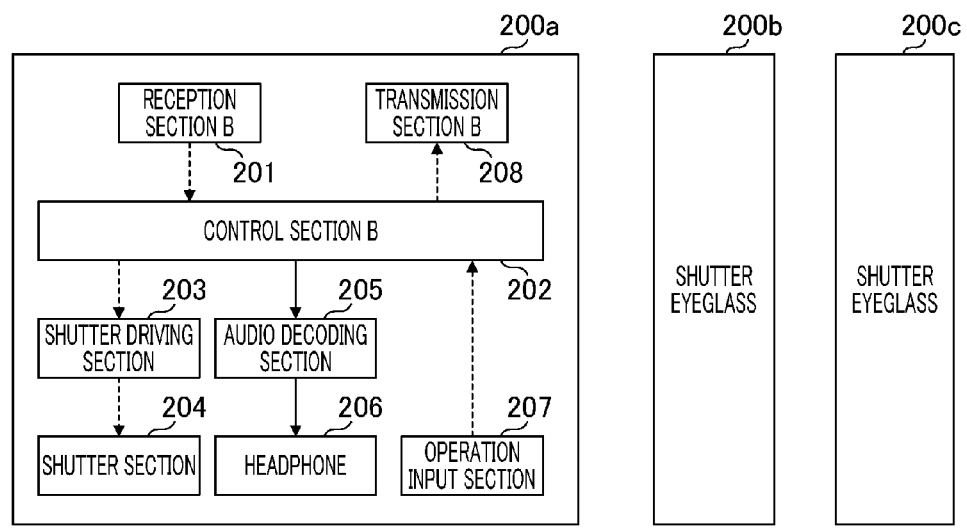

FIG. 1 is a block diagram illustrating an example of the system configuration according to an embodiment of the present invention. In order to provide a specific description in the present embodiment, the number of viewable video content items and the number of viewers are assumed to be three. However, the present invention is applicable to a system that is viewable by two or more users. The present system includes a video display apparatus 100, shutter eyeglasses 200a to 200c, an antenna 300, and playback apparatus 400a to 400c.

The video display apparatus 100 can input a broadcast signal or an outer input signal through independent three systems, and has a video time-division display function.

The antenna 300 receives a broadcast wave, and a broadcast signal is input to input processing sections 101a to 101c, respectively.

Each of the playback apparatus 400a to 400c reproduces information recorded on a recording medium, and transmits a video signal, a audio signal, and the like to the video display apparatus 100. Examples of the playback apparatus 400a to 400c include a DVD (Digital Versatile Disc) player, a BD (Blu-ray Disc) player, and the like. The read disk information is subjected to decoding processing, and a video/audio signal is output from an output terminal such as an HDMI (High-Definition Multimedia Interface) terminal or the like.

The internal configuration of the video display apparatus 100 will now be described. Each of the input processing sections 101a to 101c performs the switching between a broadcast reception process and an external input process and the channel selection of broadcast channels in accordance with control commands issued from a control section A 102 to be described below. For the broadcast reception process, each of the input processing sections receives a broadcast signal from the antenna 300, and decodes the signal into video data and audio data for outputting to a memory 103. For the external input process, an HDMI terminal is employed as an external input terminal. A video/audio signal output from each of the playback apparatus 400a to 400c is input from an HDMI terminal, and each of the input processing sections outputs video data and audio data to the memory 103.

A reception section A 106 receives a wireless signal regarding operation instructions made by an operation input section 207 provided in each of the shutter eyeglasses 200a to 200c to be described below, and transmits the content of the instruction to the control section A 102.

The control section A 102 controls the respective sections by receiving an operation instruction signal from the reception section A 106. For example, among operation information generated by the operation input section 207 provided in each of the shutter eyeglasses 200a to 200c to be described below, eyeglass power ON/OFF information, broadcast channel selection instruction information, input switch operation information, and the like are transmitted from the reception section A 106 to the control section A 102. The control section A 102 provides instructions to the input processing sections 101a to 101c about the switching between broadcast reception and external input and the channel selection of broadcast channels. In addition, the control section A 102 controls a video time-division output processing section 104, a audio encoding section 107, and the like, all of which are to be described below, and the details of which are described below.

The memory 103 is a storage device that is used for the primary storage of video data and audio data input from the input processing sections 101a to 101c. In the present embodiment, a maximum of three video content items can be input at a time. As a frame buffer for alternately performing input/output of video data, a buffer for six video frames is provided. Video data read from the memory 103 is sequentially output to the video time-division output processing section 104. The read audio data is output to the audio encoding section 107. The audio encoding section 107 adds the identification data for the shutter eyeglasses 200a to 200c to be described below to audio data read from the memory 103 and transmits the resulting data to a transmission section A 108. At this time, the control section A 102 controls the audio encoding section 107 to adjust the output timing such that the resulting data is synchronized with the video to be displayed on the display section 105. The transmitted audio data is independently output from a headphone 206 attached to each of the shutter eyeglasses 200a to 200c to be described below.

The video time-division output processing section 104 applies time-division processing to video data read from the memory 103 by controlling the control section A 102 to output the resulting data to the display section 105. Video data is time-division duplexed at the frame rate depending on the number of video content items to be displayed such that the video content items can be viewed by a plurality of persons, and the time-division duplexed data is output to the display section 105. At this time, the control section A 102 determines the number of video content items to be displayed based on the operation information, and sets the frame rate of time-division display with respect to the video time-division output processing section 104. The control section A 102 also determines the display sequence of video content items to be time-division duplexed, and sets the determined display sequence in the video time-division output processing section 104. With this setting, the display sequence of video content items to be time-division duplexed is changed.

A display section 105 receives video data, which has been generated by the video time-division output processing section 104 and subjected to time-division duplex processing, and displays the video content items at the refresh rate in accordance with the changed frame rate.

The reception section A 106 and the transmission section A 108 configure an infrared wireless communication interface section between the shutter eyeglasses 200a to 200c to be described below. The transmission section A 108 transmits a shutter control signal for controlling a shutter driving section 203 and a audio signal to the reception section B 201 of each of the shutter eyeglasses.

Next, the shutter eyeglass 200a will now be described. Since the configuration of the shutter eyeglasses 200b and 200c is the same as that of the shutter eyeglass 200a, duplicated description thereof will be omitted here. The operation of the shutter eyeglasses is controlled in association with the operation of the video display apparatus 100. The shutter eyeglass 200a includes a shutter section 204 for realizing time-division control, a headphone 206 for allowing a viewer individually to listen to audio, and an operation input section 207 for performing operations. During communication between the shutter eyeglasses and the video display apparatus 100, the individual eyeglass can be identified using the unique ID (identification information) allocated to each eyeglass.

The reception section B 201 receives a shutter control signal and a audio signal, which are transmitted from the transmission section A 108 of the video display apparatus 100, and transmits them to a control section B 202.

The control section B 202 that controls the shutter eyeglass 200a controls the power supply of the shutter eyeglass 200a in accordance with an operation signal of a power ON/OFF button from the operation input section 207. Also, the control section B 202 selects the signal(s) sent thereto using the unique ID described above while communicating with the video display apparatus 100. During data transmission, the control section B 202 also adds the unique ID to data, and thereby notifies the video display apparatus 100 about which user (transmitting source) is wearing which eyeglass. The control section B 202 transmits the shutter control signal received by the reception section B 201 to the shutter driving section 203, and transmits the audio data received by the reception section B 201 to the audio decoding section 205. User operation information generated by the operation input section 207, such as eyeglass power ON/OFF information, the channel selection of broadcast channels, or input switch operation information, is wirelessly transmitted from the control section B 202 via a transmission section B 208 to the video display apparatus 100.

The shutter driving section 203 drives the shutter section 204 in accordance with the shutter control signal from the control section B 202. The shutter section 204 is synchronized with the display operation of the display section 105 by receiving the drive signal from the shutter driving section 203, and conducts an operation such that only the video content item selected by the user with the shutter eyeglass 200a can be viewed. For example, a liquid crystal shutter is employed for the shutter section 204. The shutter section 204 controls the transmission and blockage of light depending on the ON/OFF state of the drive signal.

The audio decoding section 205 decodes the encoded audio data from the control section B 202 into analog audio data. The audio decoding section 205 adjusts the audio volume in response to volume adjustment operation instructions provided from the operation input section 207. The headphone 206 converts an analog audio signal output from the audio decoding section 205 into audio for output.

The operation input section 207 includes a plurality of operating buttons and switches that are used for a user's operation. For example, a power source button for switching the power ON/OFF state of the shutter eyeglass 200a, a broadcast channel selection button for broadcast reception, an input switch button for an external input terminal, a audio volume adjustment button, and the like are provided.

The transmission section B 208 wirelessly transmits information indicating the power ON/OFF state of the shutter eyeglass 200a, broadcast channel selection operation information, input switch operation information, and the like to the reception section A 106 of the video display apparatus 100.

Next, synchronization control during normal operation will now be described with reference to the timing chart shown in FIG. 2. In the present embodiment, the number of viewers and the number of video content items are assumed to be two.

Figure 2:
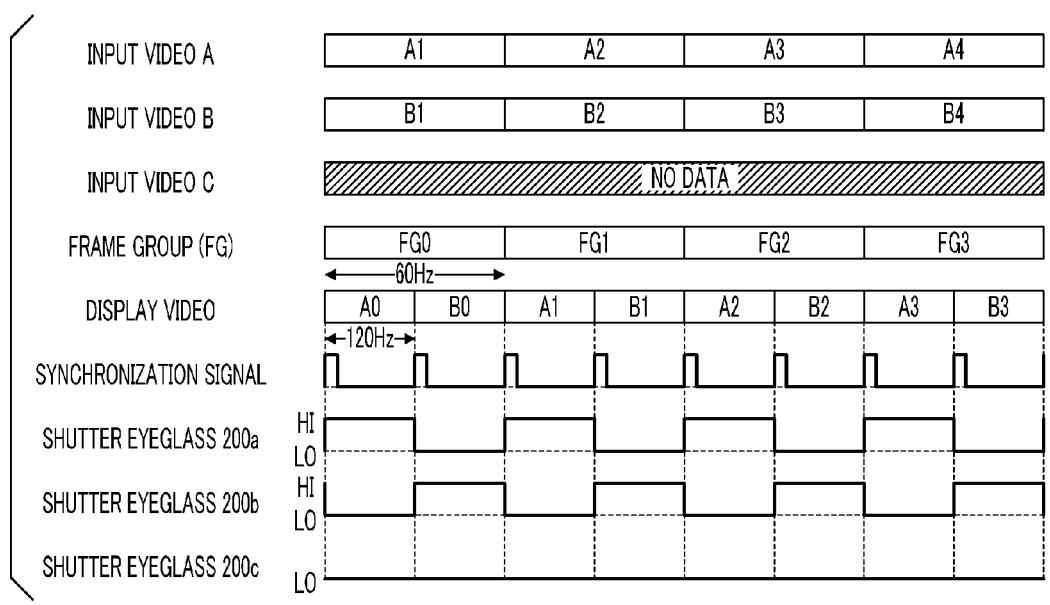
FIG. 2 is a timing chart illustrating an example of synchronization control during normal operation.

Input videos A to C in FIG. 2 are the input videos of the input processing sections 101a to 101c, respectively, and are video data to be stored in the memory 103. In the present embodiment, it is assumed that the input video C has no data with respect to input video frames A1 to A4 and B1 to B4, and the frame rate of each video data is 60 Hz. A frame group (hereinafter referred to as "FG") represents a unit of output processing performed by the video display apparatus 100, and is a signal for which the count value is increased one-by-one in a cycle corresponding to 60 Hz which is the frame rate common to the input videos A, B, and C.

The numerals A0 to A3 representing the display videos denote the output video frames for the shutter eyeglass 200a, and the numerals B0 to B3 denote the output video frames for the shutter eyeglass 200b. Since an input/output buffer is alternately used, data read from the memory 103 becomes data that is delayed by 1 frame time more than the timing of the input videos A and B. In the present embodiment, the number of viewable video content items is 2. Hence, as shown by the synchronization signal (vertical synchronization signal), the frame rate (refresh rate) of the display section 105 according to output video data is 120 Hz. In addition, each of the shutter driving sections 203 of the shutter eyeglasses 200a and 200b is driven to open the shutter section 204 when the shutter control signal is at a HI (high) level, and to close the shutter section 204 when the shutter control signal is at a LO (low) level.

The video time-division output processing section 104 reads video data in the order of display videos shown in FIG. 2 from the memory 103 by receiving the control command issued from the control section A 102, and outputs the read video data to the display section 105. In addition, the videos displayed on the display section 105 and the shutter driving of the shutter eyeglasses 200a and 200b are subjected to synchronization control by timing shown in FIG. 2, whereby an audio-video environment for a plurality of persons is realized. More specifically, in the period shown by FG1, the display section 105 displays the video frame A1 when the image data is transmitted through the shutter (open state) of the shutter eyeglass 200a, and the display section 105 displays the video frame B1 when the image data is transmitted through the shutter of the shutter eyeglass 200b.

This control allows a user wearing the shutter eyeglass 200a to view the video frame A, i.e., A0 to A3, only in the numerical order of A0 to A3 as the display video. Also, a user wearing the shutter eyeglass 200b can view the video frame B, i.e., B0 to B3, only in the numerical order of B0 to B3 as the display video in accordance with the shutter open/close timing shown in FIG. 2. Note that a shutter eyeglass 200c is not operated in a power OFF state, and thus is not subjected to control.

Next, an exemplary control to be carried out when the number of viewers and the number of video content items are increased from two to three will now be described with reference to the flowchart shown in FIG. 3 and the timing chart shown in FIG. 4. Note that FIG. 4 shows the subsequent state of FIG. 2, which shows the operations from FG3 to FG6. With respect to the input video frames A4 to A7 and the input video frames B4 to B7, the input video C is from C5 to C7. In other words, it is assumed that the shutter eyeglass 200c has been verified as being in a power ON state during the period of FG4 and the video C5 has been selected by the input processing section 101c. The parts of the input video C and the display video, which are indicated by hatching in FIG. 4, denote that there is no video data or data is incomplete to thereby make the video viewing unpleasant.

Figure 3:
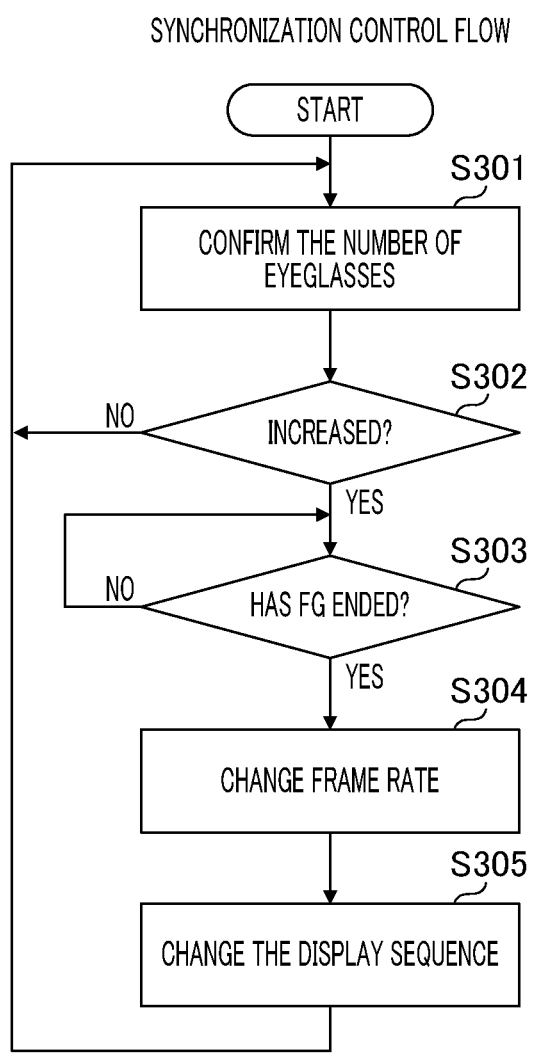
FIG. 3 is an operational flowchart when the number of video content items is increased.
Figure 4:
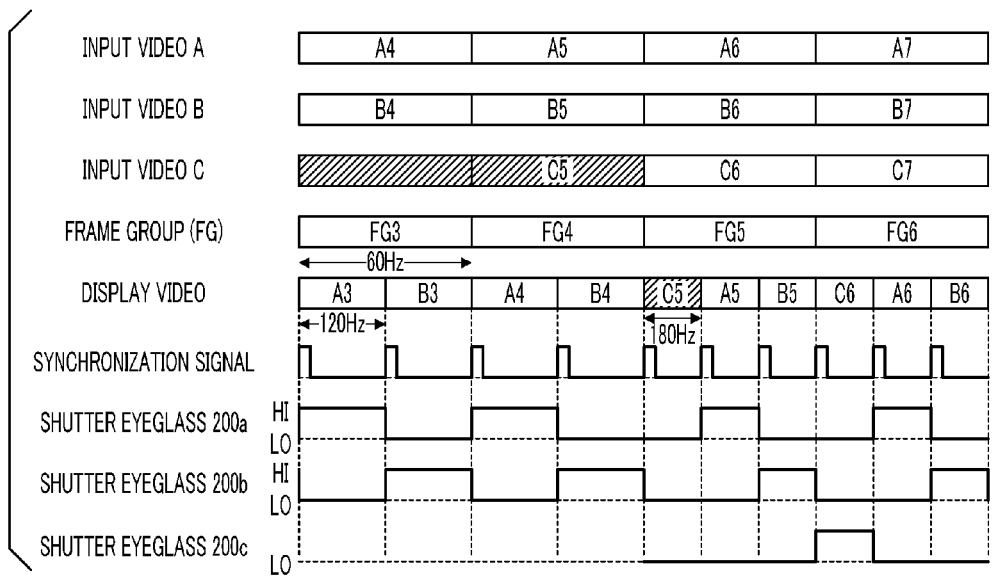
FIG. 4 is a timing chart when the number of video content items is increased from two to three.

In step S301 shown in FIG. 3, the control section A 102 checks the number of shutter eyeglasses with their power sources turned ON at this time based on information which the reception section A 106 has received from the transmission section B 208 of each of the shutter eyeglasses 200a to 200c. In the example shown in FIG. 4, the number of eyeglasses that are being used during the period of FG3 is two.

In step S302, the control section A 102 determines whether or not the number of shutter eyeglasses with their power sources turned ON has been increased. As a result, when the number of shutter eyeglasses is not increased, the process returns to step S301, whereas when the number of shutter eyeglasses is increased, the process advances to step S303. In the example shown in FIG. 4, the number of shutter eyeglasses is confirmed during the periods of FG3 and FG4, and the number of shutter eyeglasses is changed to three during the period of FG4.

In step S303, the control section A 102 determines whether or not the period of FG has ended at this time. When confirmation processing is in the middle of the period of FG, determination processing in step S303 continues, and when the period of FG has ended, the process advances to step S304. In the case of FIG. 4, processing waits until the period of FG4 ends in step S303.

In step S304, the control section A 102 performs the setting of the video time-division output processing section 104 in order to change the frame rate of the video data to be displayed on the display section 105, and also changes the frame rate of the shutter control. In the example shown in FIG. 4, the frame rate is switched from 120 Hz to the changed frame rate (refresh rate), i.e., 180 Hz, starting from the display video frame C5. As shown in FIG. 4, in association with a change in frame rate, the timing of the vertical synchronization signal is also changed. At this time, the timing of the horizontal synchronization signal is changed in a similar manner (not shown).

In step S305, the control section A 102 controls the video time-division output processing section 104 so as to change the display sequence of video frames during the period of FG. In this manner, the frame of the added video content items is displayed prior in time of the frame of other video content items. In the example shown in FIG. 4, from the period of FG5, the display sequence of video frames is changed. Then, the process returns to step S301. When the number of video content items is increased, the video frame of the added video content items is arranged at the head by the change in the display sequence of video frames. More specifically, the control section A 102 controls the video time-division output processing section 104 so as to change the order of the video frames within the period of FG from A→B to C→A→B. In this manner, the display section 105 displays the video frames in the order of C5, A5, and B5 during the period of FG5. Then, the control section A 102 sends out a control signal to the shutter eyeglasses 200a to 200c and controls them to change the order of opening and closing of these shutters. In other words, the display sequence is changed from A→B to C→A→B, and during the period of FG6, the shutter eyeglass 200c is in an open state while the display video C6 is being displayed, the shutter eyeglass 200a is in an open state while the display video A6 is being displayed, and the shutter eyeglass 200b is in an open state while the display video B6 is being displayed. However, during the period of FG5, the shutter of the shutter eyeglass 200c worn by a user is controlled to be in a closed state. This is because the breaking up of the video image should not be viewed by users during the frame period of the first video frame (C5) immediately after a change in the frame rate (refresh rate) of the display section 105. During the frame period of C5, all of the shutter eyeglasses 200a to 200c are in a closed state, and the shutter opening and closing operation starts from the next FG6 such that the display video can be viewed by the user wearing the shutter eyeglass 200c. While FIG. 4 shows an exemplary case in which the number of video content items that are to be viewed is increased from two to three, the same is applied to the case where the number of video content items that are to be viewed is increased from one to two.

According to the configuration and processing described above, a system in which a plurality of video content items can be viewed by a plurality of persons using a plurality of shutter eyeglasses can be realized. When the frame rate (refresh rate) is changed in association with the change in the number of viewed content items, the viewers can ensure that the breaking up of a video image is not viewed. Specifically, processing for adding the shutter eyeglass 200c can be performed while preventing any of the breaking up of a video image due to dropped frames or the like from being viewed by the viewing users wearing the shutter eyeglasses 200a and 200b.

Next, an exemplary control to be carried out when the number of viewers and the number of video content items are decreased from two to one will now be described with reference to the flowchart shown in FIG. 5 and the timing chart shown in FIG. 6A. Note that FIG. 6A shows the subsequent state of FIG. 2, which shows the operations from FG4 to FG7. The input video A does not show a video after frame A5. The input video B is the video frames B5 to B9. In other words, it is the case that the shutter eyeglass 200a has been confirmed as being in a power OFF state during the period of FG4, and the video input from the input processing section 101a has been stopped at the period of FG5. The parts of the input video A and the display video, which are indicated by hatching in FIG. 6, have the same meaning as described above.

Figure 5:
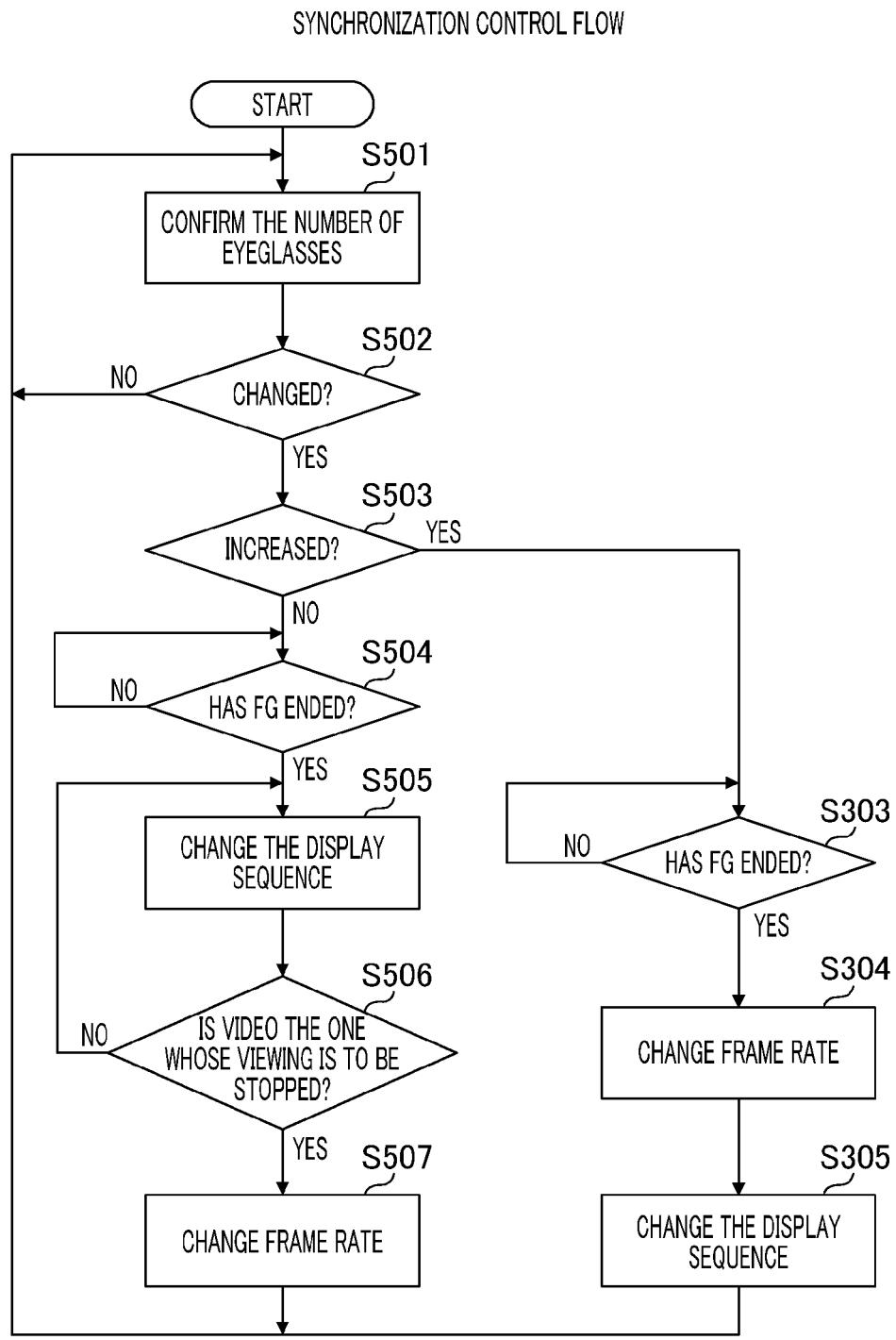
FIG. 5 is an operational flowchart when the number of video content items is decreased.
Figure 6A:
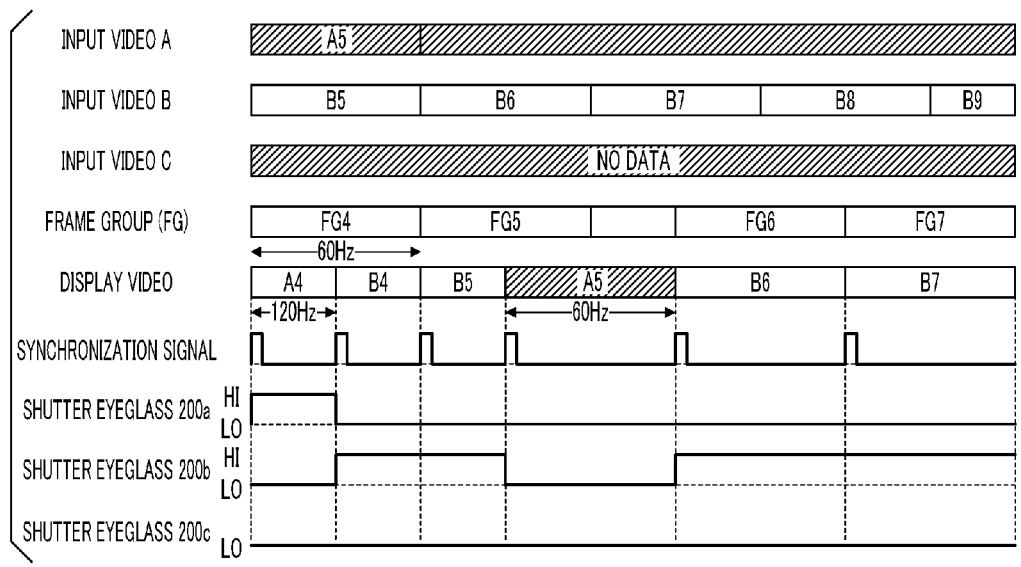
FIG. 6A is a timing chart when the number of video content items is decreased.

In step S501 shown in FIG. 5, the control section A 102 confirms the number of the shutter eyeglasses 200a to 200c that are switched ON. In the example shown in FIG. 6A, the number of eyeglasses is two during the period of FG4. In step S502, determination processing for determining whether or not the number of eyeglasses has been changed is performed. When the number of the shutter eyeglasses 200a to 200c has not been changed, the process returns to step S501, whereas when the number of eyeglasses has been changed, the process advances to step S503. In the example shown in FIG. 6A, the number of eyeglasses is confirmed during the period of FG4, and the number of eyeglasses is changed to one.

In step S503, the control section A 102 determines whether or not the number of shutter eyeglasses has increased. Consequently, when the number of eyeglasses has decreased, the process advances to step S504. On the other hand, when the number of eyeglasses has increased, the process advances to step S303. The processing in steps S303 to S305 is the same as that in steps S303 to S305 shown in FIG. 3, and no further description will be given here.

In step S504, processing for determining whether or not the period of FG has ended is performed. When determination processing is in the middle of the period of FG, determination processing in step S504 continues, and when the period of FG has ended, the process advances to step S505. In the example shown in FIG. 6A, processing waits until the period of FG4 ends in step S504. In step S505, the display sequence in the period of FG is changed.

In the example shown in FIG. 6A, the display sequence in the period of FG5 is changed. When the number of video content items is decreased, the video frame of the video content which is stopped to be viewed is arranged at the end by the change in the display sequence of video frames. More specifically, the control section A 102 controls the video time-division output processing section 104 so as to change the order of the video frames within the period of FG from A→B to B→A. In this manner, the display section 105 displays the video frames in the order of B5 and A5 during the period of FG5. In association with this, the opening and closing sequence of the shutter eyeglasses 200a to 200c is also changed from A→B to B→A. However, during the display period of A5, the shutter of the shutter eyeglass 200a worn by a user is controlled to be in a closed state so that the user does not view the video frame A5. This is because the breaking up of the video image should not be viewed by users during the frame period of the first video frame (A5) immediately after a change in the frame rate (refresh rate) of the display section 105.

Next, in step S506, it is determined whether or not the display video is a video corresponding to an eyeglass in a power OFF state. In the example shown in FIG. 6A, as described above, the control section A 102 determines whether or not the video that is the target of determination is the video frame A5 of the shutter eyeglass 200a in a power OFF state as the result of the display sequence being changed to B→A during the period of FG5. Consequently, when the target video frame is A5, the process advances to step S507. Otherwise, the process returns to step S505.

In step S507, the control section A 102 changes the setting of the frame rate of the video time-division output processing section 104 in order to change the frame rate of video data to be displayed on the display section 105. The control section A 102 also changes the frame rate of shutter control. In the example shown in FIG. 6A, the frame rate is switched from 120 Hz to the changed frame rate (refresh rate), i.e., 60 Hz, starting from the display video frame A5 of FG5. Subsequently, the process returns to step S501.

Figure 6B:
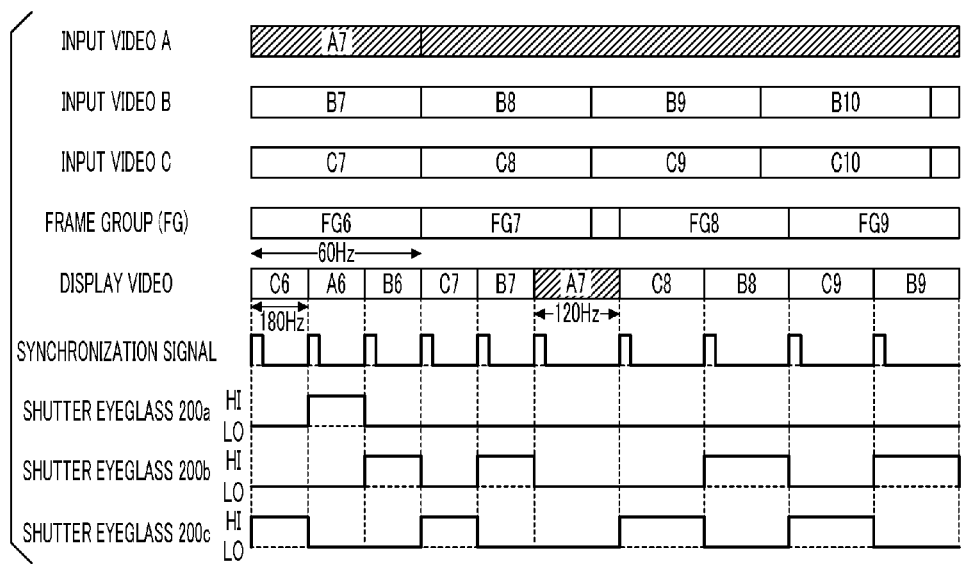
FIG. 6B is a timing chart when the number of video content items is decreased.

Next, an exemplary control to be carried out when the number of viewers and the number of video content items are decreased from three to two will now be described with reference to the operational flowchart shown in FIG. 5 and the timing chart shown in FIG. 6B. Note that FIG. 6B shows the subsequent state of FG5 shown in FIG. 4, which shows the operations from FG6 to FG9. The input video A does not show a video after frame A7. The input video B is the video frames B7 to B10, and the input video C is the video frames C7 to 010. In other words, it is the case that the shutter eyeglass 200a has been confirmed as being in a power OFF state during the period of FG6, and the video input from the input processing section 101a has been stopped at the period of FG7. The parts of the input video A and the display video, which are indicated by hatching in FIG. 6B, have the same meaning as described above. The basic flow of processing is the same as that shown in FIG. 6A, and the following description will only be given of differences.

In step S502, the number of shutter eyeglasses is confirmed during the period of FG6, and the number of eyeglasses is changed from three to two. In step S503, the control section A 102 determines that the number of eyeglasses has decreased. Then, the process advances to step S504, and the processing waits until the period of FG6 ends in step S504.

In step S505, the display sequence of video frames during the period of FG7 is changed from C→A→B to C→B→A, and the display section 105 displays the video frames in the order of C7, B7, and A7 during the period of FG7. In association with this, the opening and closing sequence of the shutter eyeglasses 200a to 200c is also changed from C→A→B to C→B→A. However, during the period of FG7, the shutter of the shutter eyeglass 200a worn by a user is controlled to be in a closed state so that the user does not view the video frame A7. This is because the breaking up of the video image should not be viewed by users during the frame period of the first video frame (A7) immediately after a change in the frame rate (refresh rate) of the display section 105.

In step S506, it is determined that the video frame A7 of the shutter eyeglass 200a in a power OFF state has had its turn, and the process advances to step S507. The frame rate is switched from 180 Hz to the changed frame rate (refresh rate), i.e., 120 Hz, starting from the video frame A7 of FG7, and the frame rate of shutter control is also changed in a similar manner. Then, the process returns to step S501.

Although not described further, when the number of viewers or the number of video content items has decreased, the video display apparatus 100 in the present embodiment treats the corresponding input video as black image data. Also, when the power supplies of the shutter eyeglasses 200a to 200c are in an OFF state, the video display apparatus 100 inactivates the shutter control signal and the audio signal, whereby the shutter opening and closing operation and audio output control are not performed.

Figure 7A:
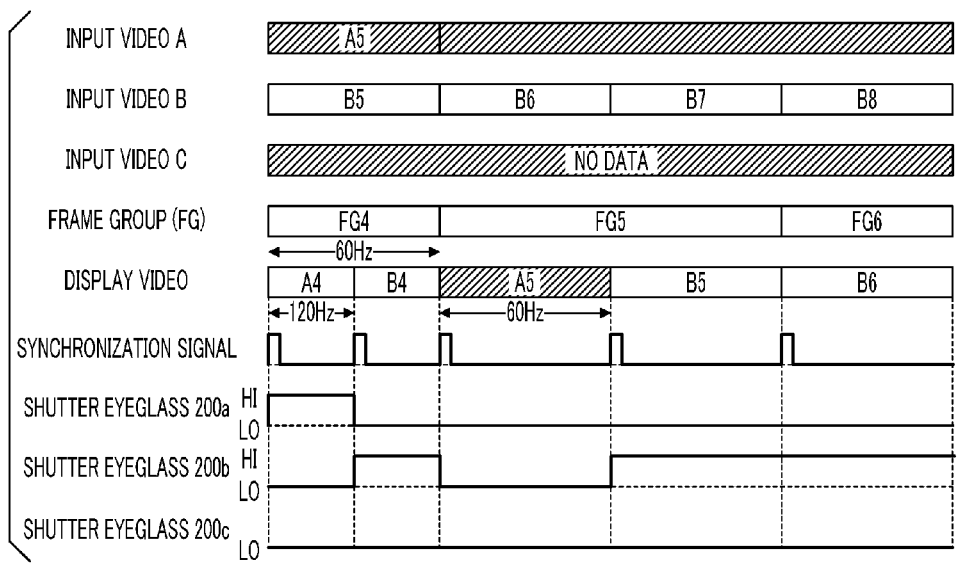
FIG. 7A is a timing chart illustrating another example of operation control when the number of video content items is decreased.
Figure 7B:
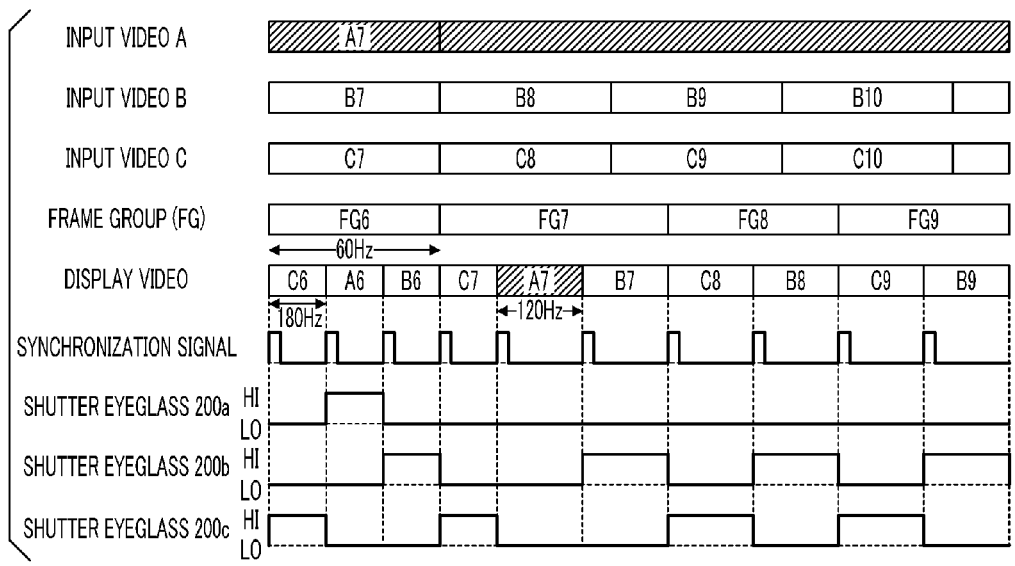
FIG. 7B is a timing chart illustrating another example of operation control when the number of video content items is decreased.

FIG. 6A shows an example in which the order of the video frames of the display videos has changed from A→B to B→A during the period of FG5, and FIG. 6B shows an example in which the order of the video frames of the display videos has changed from C→A→B to C→B→A during the period of FG7. The present invention is not limited thereto, but may be applied to an embodiment in which the order of the video frames of the display videos is maintained without changing, as shown in FIG. 7. In other words, in the case shown in FIG. 7A, the display period of video frame B5 is lengthened compared to that shown in FIG. 6A (see 60 Hz), and the delay amount of the video after changing the frame rate slightly increases. In the case shown in FIG. 7B, the display period of video frame B7 is lengthened compared to that shown in FIG. 6B (see 120 Hz), and the delay amount of the video after changing the frame rate slightly increases. However, the order of the video frames does not need to be changed, and the processing load within the device is thereby reduced.

As described above, in a system in which a plurality of video content items can be viewed by a plurality of persons using a plurality of shutter eyeglasses, the viewers can ensure that the breaking up of the video image is not viewed when the frame rate (refresh rate) is changed in association with the change in the number of viewed content items. Specifically, processing for excluding the shutter eyeglass 200c from control can be performed while preventing any of the breaking up of the video image due to dropped frames or the like from being viewed by the viewing users wearing the shutter eyeglasses.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-251758 filed Nov. 2, 2009, and Japanese Patent Application No. 2010-157793 filed Jul. 12, 2010 which are hereby incorporated by reference herein in their entirety.

What is claimed is:

1. A video display apparatus that outputs a plurality of video content items to a display unit by time-division such that the plurality of different video content items are viewable to a plurality of persons by using a plurality of shutter eyeglasses, and performs the shutter control of the plurality of shutter eyeglasses in association with the video content items which are to be viewed, the video display apparatus comprising:

a processing unit configured to apply time-division processing to a video data configured by the plurality of video content items, and output the video content items on the display unit by time-division; and a control unit configured to control a frame rate of the video data configured by the video content items which are output on the display unit by the processing unit depending on the number of video content items which are to be viewed, and to perform the shutter control of the plurality of shutter eyeglasses, wherein, when the number of video content items which are to be viewed is changed, the control unit changes the frame rate of the video data configured by the video content items which are output by the processing unit on the display unit, and controls the shutters of the plurality of shutter eyeglasses corresponding to the video content items which are to be viewed after the change of the number of video content items to close for the first frame period of the video content item that is first output after the change of the frame rate, and wherein, when the number of video content items which are to be viewed is increased, the control unit determines the sequence of the video content items which are output by the processing unit on the display unit such that the frame of the additional video content is output first in a same frame group after the change of the number of video content items which are to be viewed.

2. A video display apparatus that outputs a plurality of video content items to a display unit by time-division such that the plurality of different video content items are viewable to a plurality of persons by using a plurality of shutter eyeglasses, and performs the shutter control of the plurality of shutter eyeglasses in association with the video content items which are to be viewed, the video display apparatus comprising:

a processing unit configured to apply time-division processing to a video data configured by the plurality of video content items, and output the video content items on the display unit by time-division; and a control unit configured to control a frame rate of the video data configured by the video content items which are output on the display unit by the processing unit depending on the number of video content items which are to be viewed, and to perform the shutter control of the plurality of shutter eyeglasses, wherein, when the number of video content items which are to be viewed is changed, the control unit changes the frame rate of the video data configured by the video content items which are output by the processing unit on the display unit, and controls the shutters of the plurality of shutter eyeglasses corresponding to the video content items which are to be viewed after the change of the number of video content items to close for the first frame period of the video content item that is first output after the change of the frame rate, and wherein, when the number of video content items which are to be viewed is decreased, the control unit determines the sequence of the video content items which are output by the processing unit on the display unit such that the frame of the video content which is to be interrupted is output last in a same frame group before the change of the number of video content items which are to be viewed.

3. A method for controlling a video display apparatus, the method comprising:

a processing step of applying time-division processing to a video data configured by a plurality of video content items, and output the video content items on the display unit by time-division such that the plurality of different video content items are viewable to a plurality of persons by using a plurality of shutter eyeglasses; and a control step of performing the shutter control of the plurality of shutter eyeglasses in association with the video content items which are to be viewed, wherein, when the number of the video content items which are to be viewed is changed, the control step changes the frame rate of the video data configured by the video content items which are output by the processing unit on the display unit depending on the number of video content items which are to be viewed, and closes the shutters of the plurality of shutter eyeglasses corresponding to the video content items which are to be viewed after the change of the number of video content items for the first frame period of the video content item that is first output after a change of the frame rate, and wherein, when the number of video content items which are to be viewed is increased, the control step determines the sequence of the video content items which are output by the processing unit on the display unit such that the frame of the additional video content is output first in a same frame group after the change of the number of video content items which are to be viewed.

4. A method for controlling a video display apparatus, the method comprising:

a processing step of applying time-division processing to a video data configured by a plurality of video content items, and output the video content items on the display unit by time-division such that the plurality of different video content items are viewable to a plurality of persons by using a plurality of shutter eyeglasses; and a control step of performing the shutter control of the plurality of shutter eyeglasses in association with the video content items which are to be viewed, wherein, when the number of the video content items which are to be viewed is changed, the control step changes the frame rate of the video data configured by the video content items which are output by the processing unit on the display unit depending on the number of video content items which are to be viewed, and closes the shutters of the plurality of shutter eyeglasses corresponding to the video content items which are to be viewed after the change of the number of video content items for the first frame period of the video content item that is first output after a change of the frame rate, and wherein, when the number of video content items which are to be viewed is decreased, the control step determines the sequence of the video content items which are output by the processing unit on the display unit such that the frame of the video content which is to be interrupted is output last in a same frame group before the change of the number of video content items which are to be viewed.

5. The video display apparatus according to claim 1, wherein, when the number of video content items which are to be viewed is increased, the processing unit output the frame of the additional video content in the first frame period after the change of the frame rate.

6. The video display apparatus according to claim 2, wherein, when the number of video content items which are to be viewed is decreased, the processing unit outputs the frame of the video content which is to be interrupted in the first frame period after the change of the frame rate.

7. The method according to claim 3, wherein, when the number of video content items which are to be viewed is increased, the processing step outputs the frame of the additional video content in the first frame period after the change of the frame rate.

8. The method according to claim 4, wherein, when the number of video content items which are to be viewed is decreased, the processing step outputs the frame of the video content which is to be interrupted in the first frame period after the change of the frame rate.

* * * * *